United States Patent [19]

Polyak et al.

[11] 4,144,958
[45] Mar. 20, 1979

[54] DEVICE TO EFFECT CONTROL OVER THE FRICTION CLUTCH OF A TRANSPORT VEHICLE

[76] Inventors: David G. Polyak, ulitsa Smolnaya, 31, kv. 51; Evgeny I. Lebedev, Kronshtadsky bulvar, 29, kv. 34; Jury K. Esenovsky-Lashkov, ulitsa Festivalnaya, 31, kv. 125, all of Moscow; Boris N. Pyatko, prospekt Bogdana Khmelnitskogo, 35, kv. 17, Melitopol; Vladimir M. Mosyagin, prospekt Lenina, 93, kv. 26, Zaporozhie, all of U.S.S.R.

[21] Appl. No.: 716,147

[22] Filed: Aug. 20, 1976

[51] Int. Cl.² .................................. F16D 43/284
[52] U.S. Cl. ........................ 192/105 F; 192/0.076; 192/3.58; 192/91 R
[58] Field of Search ......... 192/103 F, 103 FA, 104 F, 192/105 F, 91 R, 0.076

[56] References Cited
U.S. PATENT DOCUMENTS

| | | | |
|---|---|---|---|
| 3,204,730 | 9/1965 | Alfieri et al. | 192/91 R X |
| 3,402,793 | 9/1968 | Scholl | 192/0.076 X |
| 3,908,514 | 9/1975 | Rist | 192/91 R X |

Primary Examiner—Benjamin W. Wyche
Attorney, Agent, or Firm—Fleit & Jacobson

[57] ABSTRACT

A device comprising a motor housing communicating with a pressure source and with the atmosphere through a traversable valve member operatively interlinked with the engine crankshaft, a link accommodated in the hollow space of the housing traversably in response to a pressure variation therein and operatively interconnected with the actuator of the clutch, a magnet for operating the valve member to disengage said clutch. Said operative association of said traversable member with the engine crankshaft is effected through an electric crankshaft speed transmitter and a transducer unit to convert the frequency of a signal from said electric transmitter into a current magnitude, the input of said unit being electrically connected to said electric transmitter and the output thereof, to the coil of said magnet, the armature of which is interconnected with the valve member. The construction of the device is simple, which enables the device to be located practically at any suitable place of a transport vehicle.

1 Claim, 7 Drawing Figures ced with a diaphragm 13. An opening 14 is provided
DEVICE TO EFFECT CONTROL OVER THE FRICTION CLUTCH OF A TRANSPORT VEHICLE The device provided according to the present invention is most expedient to be applied in motor cars to control the friction clutches thereof. Such devices are likewise quite practicable to be used in lorries and buses.

Known in the present state of the art are devices for controlling the friction clutches of transport vehicles, comprising a housing with an opening therein to communicate its interior with a source of pressure or with the atmosphere, depending upon the signal sent by the crankshaft speed transmitter in the capacity of which a centrifugal speed governor is used in the device being discussed, that is kinematically linked with the engine crankshaft. For positively disengaging the clutch in the course of gear shifting, the device considered herein makes use of a magnet whose armature is adaped to actuate the traversable member, whereby the clutch housing interior gets communicated with the source of pressure.

In the afore-said devices, an automatic control of the moment of friction effective in the clutch is by virtue of the centrifugal speed governor, whereas a positive clutch disengagement is effected by a magnet.

However, provision of a centrifugal speed governor and a magnet in a single device sophisticates the construction thereof.

Moreover, whenever said devices are to be applied for control over the friction clutches featuring diverse performance characteristics, this necessitates replacement of some components of the centrifugal speed governor; this in turn restricts the field of application of said devices.

It is an object of the present invention to provide a device to control the friction clutch of a transport vehicle, wherein the traversable member is operatively associated with the engine crankshaft in such a manner that the construction of the device is substantially simplified and its mounting on diverse types of transport vehicles is facilitated.

It is another object of the present invention to provide such a device of the character set forth hereinbefore that could be installed in any suitable place of a transport vehicle.

It is one more object of the present invention to enable the device to be used in transport vehicles already in service.

In accordance with said and other objects, proposed herein is a device to control the friction clutch of a transport vehicle, comprising a hollow housing whose interior communicates with a source of pressure and with the atmosphere through a traversable member operatively associated with the engine crankshaft, a link accommodated in the interior space of the housing traversably in response to a pressure variation therein and operatively associated with the clutch actuator, and a clutch positive disengagement magnet, wherein according to the invention, said operative association between the traversable member and the engine crankshaft is effected through an electric crankshaft speed transmitter and a transmitter signal frequency-to-current transducer whose input is electrically connected to said transmitter, while the output thereof, to the coil of said magnet the armature of which is mechanically associated with the traversable member.

A device to effect control over the friction clutch of a transport vehicle, made according to the present invention, can be mounted in a most convenient place of the vehicle suitable for the purpose and is applicable in diverse types of transport vehicles without any alterations to the construction thereof.

Besides, said devices can be mounted on transport vehicles at service stations, whereby prerequisites are provided for motor cars already in service to be outfitted with said devices.

A specific embodiment of the present invention is disclosed below by way of example with reference to the accompanying drawings.

BRIEF DESCRIPTION OF ACCOMPANYING DRAWINGS AND LIST OF REFERENCE NUMERALS USED THEREIN

FIG. 4 represents the position of the valve when the interior of the clutch housing communicates with the source of pressure;

FIG. 5 shows the position of the valve when the interior of the clutch housing is disconnected both from the pressure source and from the atmosphere;

Figure 1:
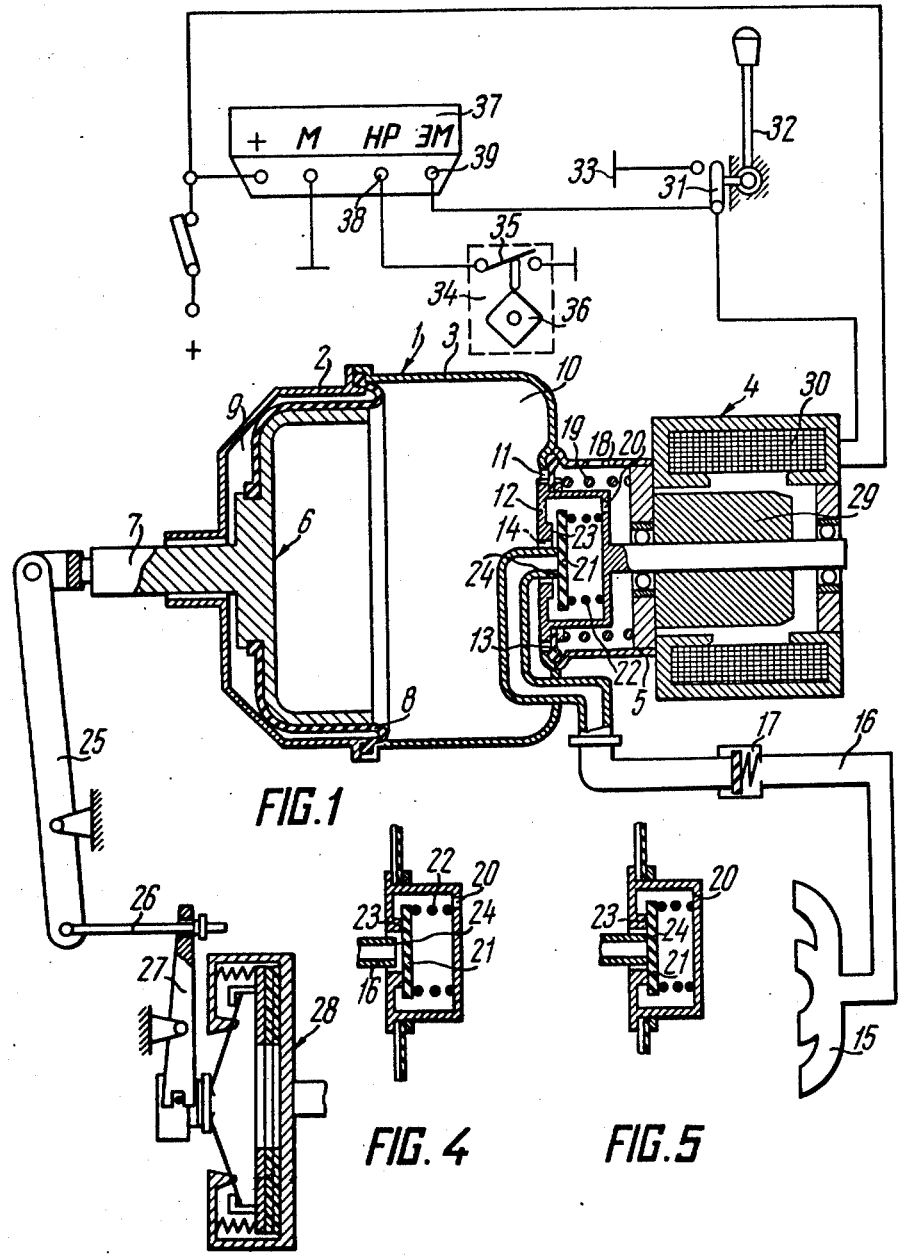
FIG. 1 is a schematic longitudinal-section view of a device for controlling the friction clutch of a transport vehicle, according to the invention; showing the valve in the position corresponding to the clutch housing communicating with the atmosphere.

4 — magnet
12 — traversable member
21 — armature
30 — coil
34 — transmitter
37 — transducer unit
38 — input of the unit
39 — output of the transducer unit Reference being now directed to FIG. 1, the device of the invention comprises a housing 1 composed of two pieces 2 and 3 that define the interior space thereof. A magnet 4 with a cover 5 is attached to the housing 1.

A link 6 is accommodated in the interior of the housing 1, said link comprising a rod 7 and a diaphragm 8 connected thereto and held along its peripheral edge in between the pieces 2 and 3 of the housing 1. The link 6 divides the interior space of the housing 1 into compartments 9 and 10, the former being permanently communicated with the atmosphere.

An opening 11 is provided in the piece 3 of the housing 1, accommodating a hollow traversable member 12 sealed with a diaphragm 13. An opening 14 is provided in the traversable member 12 for the compartment 10 to communicate with the atmosphere and with a pressure source 15 (in the capacity of which the engine intake manifold is used) via a pipe 16 provided with a check valve 17.

The traversable member 12 is accommodated also in the hollow of the cover 5 which has an opening 18 to communicate said hollow with the atmosphere. The same hollow houses also a spring 19 fitted in between the traversable member 12 and the magnet 4. An opening 20 is made in the wall of the traversable member 12 to communicate the hollow thereof with the atmosphere.

A valve 21 is mounted in the hollow of the traversable member 12, adapted to be forced against seats 23 and 24 under the action of a spring 22, said seats being provided respectively on the traversable member 12 and the pipe 16.

The rod 7 is connected to an actuator 27 of a clutch 28 through an arm 25 and tie-piece 26.

The traversable member 12 is interconnected with an armature 29 of the magnet 4 whose coil 30 can be electrically connected to either of the poles 33 of the power source (not shown) through a switch 31 controlled from a gearshift lever 32.

The traversable member 12 is operatively associated with the engine crankshaft (not shown), said operative association comprising: an electric speed transmitter 34 of the crankshaft speed, said trasmitter having a switch 35 whose contacts are made to open or close by rotating a cam 36 of the contact breaker (not shown) of the engine ignition system; a transducer unit 37 to convert the frequency of a signal from the transmitter 34 into a current magnitude, an input 38 of said unit being electrically connected to the transmitter 34 and an output 39 thereof, to the coil 30 of the magnet 4 the armature 29 of which is interconnected with the traversable member 12.

Provision of an operative interconnection of the traversable member 12 with the crankshaft through the electric transmitter 34 of the crankshaft speed, the transducer unit 37 for converting the frequency of a signal from the transmitter 34 into a current magnitude, the input of said unit being connected to the transmitter 34 and the output thereof, to the coil 30 of the magnet 4 whose armature 29 is interconnected with the traversable member 12, makes it possible to substantially simplify the construction of the device and facilitate its installation on diverse types of transport, vehicles, as compared to constructions of the known devices for controlling friction clutches. It is due to such an implementation of the operative association of the traversable member 12 with the engine crankshaft that the traversable member 12 with the magnet 4 is practicable to be mounted at any place of a transport vehicle, including those already in service.

An arm 40 (FIG. 2) interconnected with the rod 7 is practicable to be coupled to the actuator 27 of the clutch 28 through hydraulically interconnected actuating cylinders 41 and 42. With such an object in view, the arm 40 is articulated to a rod 43 of the actuating cylinder 41 and a rod 44 of the actuating cylinder 42 is connected to the actuator 27 of the clutch 28. Such a connection makes is possible to mount the whole device practically at any place of a transport vehicle.

A magnet 45 (FIG. 3) is expedient to attach to a piece 46 of a housing 47 substantially crosswise to the axis of the link 6. This being the case, concentric openings 49 and 50 are provided in the piece 46 of the housing 47 and in a cover, respectively, whereas a movable seal is interposed between a valve 51 and the cover 48. The hollow space of the cover 48 accommodates a diaphragm 53 made fast on the cover 48 and on a traversable member 54, a spring 56 being provided between the latter and a cover 55 for said member to force against the valve 51.

The device to effect control over the friction clutch of a transport vehicle operates as follows (FIG. 1).

With the engine crankshaft running at low speeds at which the clutch 28 is to be disengaged, and with the unit 37 energized the latter ensures that a high-intensity current is fed to the coil 30 of the magnet 4. The result is that the armature 29 together with the traversable member 12 connected thereto, traverses to the right (as viewed in the drawing). In this case the valve 21 is forced against the seat 23 (FIG. 4), and is urged to travel to the right complete with the traversable member 12, thus compressing the spring 19. Thus the valve 21 opens the pipe 16, with the result that the compartment 10 is disconnected from the atmosphere and gets communicated with the pressure source 15 through the pipe 16, the check valve 17 and the opening 14. As a result, the air is drawn out from the compartment 10 which eventuates in the link 6 traversing to the right (as viewed in the drawing) and in a higher force applied to the traversable member 12 due to a pressure differential effective in the compartment 10 and in the hollow of the cover 5. As soon as said force and the force developed by the spring 19 overcome the pull of the magnet 4, the traversable member 12 will travel to the left. This results in that the valve 21 fits upon the seat 24 of the pipe 16, thus isolating the compartment 10 from the pressure source 15, and the travel of the link 6 discontinues, and the compartment 10 becomes communicated with the atmosphere through the openings 14, 20 and 18. This eventuates in the air making way into the compartment 10 and urging the link 6 to displace to the left. As a result, the pressure differential in the compartment 10 and in the hollow of the cover 5 diminishes, thus reducing the force exerted upon the traversable member 12 due to said pressure differential. As soon as said force in combination with the force of tension of the spring 19 gets inferior to the pull developed by the magnet 4, the traversable member 12 will move to the right again. The valve 21 will thus come off the seat 24 of the pipe 16 to communicate the compartment 10 with the pressure source 15, and so on. Besides, a position is possible, wherein the valve 21 rests simultaneously upon the seats 23 and 24 (FIG. 5) of the traversable member 12 and the pipe 16, respectively.

Performance characteristics of the magnet 4, the springs 19, 22 and the diaphragm are so matched that at low crankshaft speeds the pressure effective in the compartment 10 be such as to urge the link 6 and the rod 7 to displace so as to turn the arm 25 and traverse the actuator 27 of the clutch 28 to disengage the latter.

As the crankshaft speed becomes higher, the unit 37 decreases the intensity of the current flowing along the coil 30 of the magnet 4 to reduce the pull thereof. In such case, an equilibrium between the pull of the magnet 4 and the force developed by the spring 19 combined with the force exerted upon the traversable member 12 due to the pressure differential effective in the compartment 10 and in the hollow of the cover 5 is attained at a lower difference between the both pressures. Thus, the link 6 travels to the left, thereby increasing the moment of friction in the clutch 28.

At a definite crankshaft speed the unit 37 so much decreases the current magnitude effective in the coil 30 of the magnet 4 that the traversable member 12 is urged by the spring 19 to come off the valve 21 (as shown in FIG. 1) even when the compartment 10 is communicated with the atmosphere and, consequently, no force is applied to the traversable member 12 resulting from the pressure differential effective in the compartment 10 and in the hollow of the cover 5. On account of this, a permanent communication of the compartment 10 with the atmosphere and, thereby, an engagement of the clutch 28 is attained.

Positive disengagement of the clutch 28 in the course of gear-shifting is achieved due to energizing the coil 30 of the magnet 4 by connecting it directly to the power source by closing the switch 31 which occurs when the driver operates the gearshift lever 32.

Connection of the coil 30 of the magnet 4 directly to the power source is concerned with passing a maximum current through the coil 30 and results in the armature 29 of the magnet 4 travelling to the rightmost position. The pull developed by the magnet 4 in this case proves to be much superior to the force of the spring 19 combined with that resulting from the pressure differential in the compartment 10 and in the hollow of the cover 5. That is why the traversable member 12 remains in the rightmost position even when the compartment 10 is in permanent communication with the pressure source 15, whereby the link 6 travels to the rightmost position as well. Thus, the clutch 28 is completely disengaged so as to obviate any residual moment of friction therein (the so-called drag moment).

Figure 2:
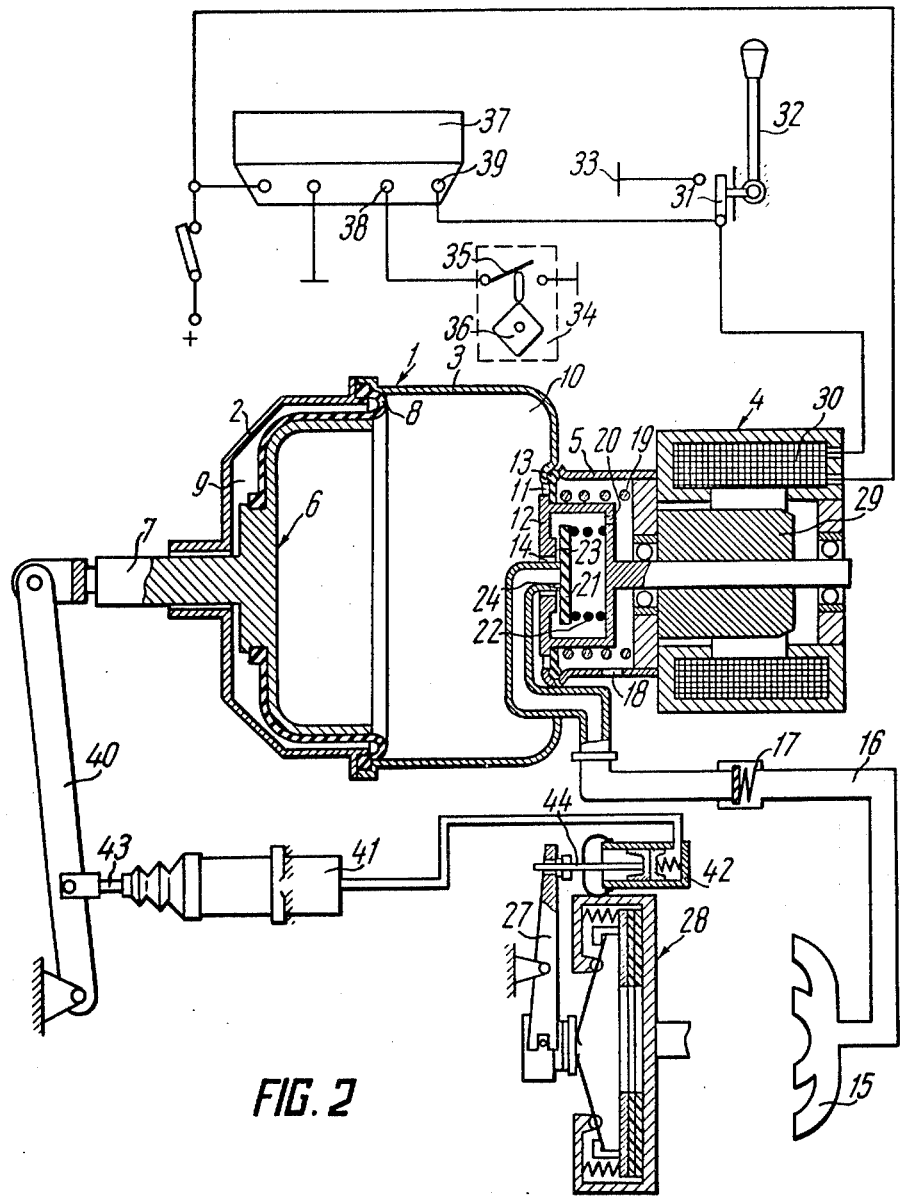
FIG. 2 shows the device of FIG. 1 as interconnected with the clutch actuator through a hydraulic drive.

In an embodiment of the device as shown in FIG. 2 the latter operates similarly to that described above, with the exception that the rod 7 exerts upon the clutch actuator 27 through the actuating cylinders 43 and 44.

It is due to such a linkage of the device with the clutch actuation mechanism that it can be located practically at any suitable place of a transport vehicle.

Figures 3, 6, 7:
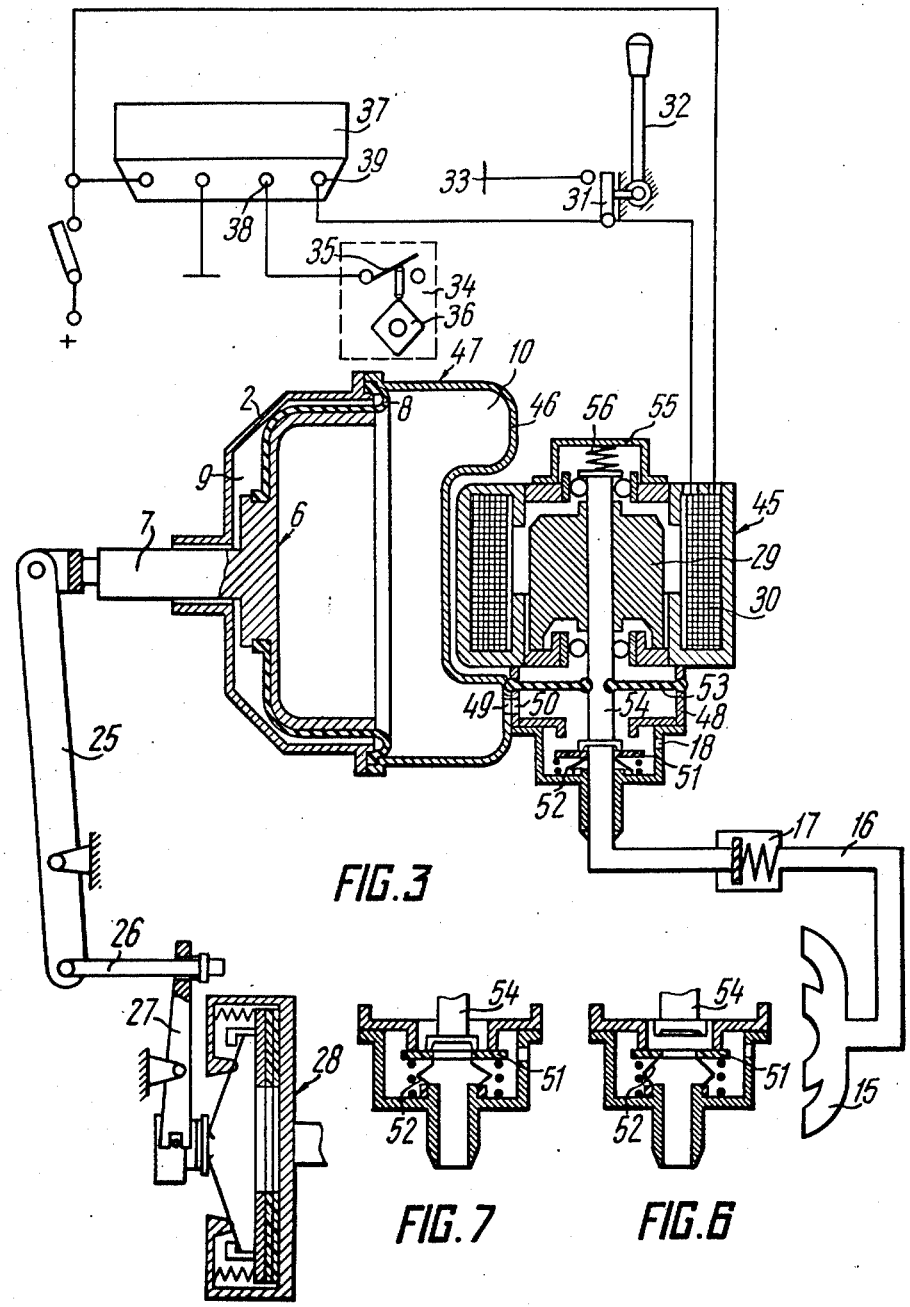
FIG. 3 illustrates another embodiment of a device for controlling the friction clutch of a transport vehicle, showing the valve in the position corresponding to the clutch housing communicating with the atmosphere.
FIG. 6 is a view of FIG. 4 as applied to another embodiment of the device.
FIG. 7 is a view of FIG. 5 as applied to another embodiment of the device.

In an embodiment of the device as shown in FIG. 3 the latter functions quite similarly to that described above.

Pilot-run items of the device for friction clutch control have been successfully tested on motor cars to ensure reliably clutch engagement and disengagement as well as automatic regulation of the moment of friction effective in the clutches depending on the engine crankshaft speed.

What we claim is:

1. A device to effect control over the friction clutch of a transport vehice having an engine comprising a hollow housing communicating, via a pipeline supplied with a seat, with a pressure source and with the atmophere; a traversable member supplied with a seat, through which a hollow space of said housing communicates with the pressure source and the atmosphere and which is operatively interlinked with a crankshaft of the engine; a spring-actuated valve movable into a position simultaneously in contact with both of said seats; a link accomodated in the hollow space of said housing traversable in response to a pressure variation therein and operatively interconnected with an actuator of said clutch, an electro-magnet for controlling disengagement of said clutch; an operative association of said traversable member with the engine crankcraft, comprising a crankshaft speed transmitter including a switch having contacts opened and closed during the rotation of a cam of a contact breaker of an ignition system of the engine, a transducer unit to convert the frequency of a signal generated by the opening and closing of the contacts into a current magnitude, the input of said unit being electrically connected to one of the contacts of the switch of said crankshaft speed transmitter and the output being electrically connected to a coil of said electro-magnet; an armature of said electro-magnet being interconnected with said traversable member.

* * * * *